United States Patent
Doi et al.

(10) Patent No.: US 7,166,677 B2
(45) Date of Patent: Jan. 23, 2007

(54) POLYPROPYLENE RESIN COMPOSITIONS

(75) Inventors: Kazuhiro Doi, Sodegaura (JP); Ikunori Sakai, Sodegaura (JP); Takayuki Nagai, Toyota (JP); Takeshi Sekito, Susono (JP); Susumu Kanzaki, Kisarazu (JP); Mitsuji Tsuji, Ichihara (JP)

(73) Assignees: Mitsui Chemicals, Inc., Tokyo (JP); Toyota Jidosha Kabushiki Kaisha, Toyota (JP); Sumitomo Chemical Company, Limited, Tokyo (JP)

( * ) Notice: Subject to any disclaimer, the term of this patent is extended or adjusted under 35 U.S.C. 154(b) by 112 days.

(21) Appl. No.: 11/081,500

(22) Filed: Mar. 17, 2005

(65) Prior Publication Data

US 2005/0209387 A1    Sep. 22, 2005

(30) Foreign Application Priority Data

Mar. 19, 2004  (JP) ............................. 2004-080255
Mar. 19, 2004  (JP) ............................. 2004-080256

(51) Int. Cl.
C08L 23/12  (2006.01)
C08L 23/14  (2006.01)
C08L 25/10  (2006.01)
C08L 3/34   (2006.01)

(52) U.S. Cl. ................ 525/240; 525/241; 524/451
(58) Field of Classification Search ............... 525/240, 525/241, 231; 524/451
See application file for complete search history.

(56) References Cited

U.S. PATENT DOCUMENTS 5,212,239 A * 5/1993 Mallikarjun ................. 525/74
5,276,093 A * 1/1994 Kitagawa et al. ............ 525/89
5,462,987 A * 10/1995 Shinonaga et al. .......... 524/451
5,556,910 A * 9/1996 Harada et al. ............... 524/504
5,573,856 A * 11/1996 Shinonaga et al. ........ 428/424.8
5,585,187 A * 12/1996 Shinonaga et al. ........ 428/424.8
5,889,100 A * 3/1999 Asai et al. .................. 524/451
6,730,728 B1 * 5/2004 Matsuda et al. ............ 524/451

FOREIGN PATENT DOCUMENTS

| JP | 60-65064 A | | 4/1985 |
| JP | 05-64660 B2 | | 9/1993 |
| JP | 7-149971 | * | 6/1995 |
| JP | 7-292182 | * | 11/1995 |
| JP | 08 041276 A | | 2/1996 |
| JP | 8-279310 A | | 10/1996 |
| JP | 10-101891 A | | 4/1998 |
| JP | 10 101893 A | | 4/1998 |
| JP | 2003-231824 A | | 8/2003 |

* cited by examiner

Primary Examiner—David W. Wu
Assistant Examiner—Rip A. Lee
(74) Attorney, Agent, or Firm—Birch, Stewart, Kolasch & Birch, LLP

(57) ABSTRACT

A polypropylene resin composition comprises (A) (a-1) a specific crystalline propylene/ethylene block copolymer or (a-3) a polymer mixture comprising the (a-1) and (a-2) a specific crystalline propylene-homopolymer in specific ratio, in an amount of 5 to 56% by weight, (B) a hydroxyl group-containing polypropylene having an intrinsic viscosity [η] of 0.8 to 2.0 dl/g and a melting point of 150 to 168° C., in an amount of 10 to 45% by weight, (C) a copolymer rubber of ethylene and an α-olefin having a melt flow rate (ASTM D-1238, 230° C., load of 2160 g) of 0.5 to 15 g/10 min, in an amount of 18 to 25% by weight, (D) a hydrogenation product of a block copolymer containing a polymer block of a monovinyl-substituted aromatic hydrocarbon compound and a polymer block of a conjugated diene compound, in an amount of 1 to 10% by weight, and (E) an inorganic filler in an amount of 15 to 25% by weight, the total amount of said components (A), (B), (C), (D) and (E) being 100% by weight, hydroxyl group-containing monomer units derived from the hydroxyl group-containing polypropylene (B) being contained in amounts of 1.3 to 4.0% by weight in 100% by weight of the polypropylene resin composition. The polypropylene resin composition exhibits excellent coating adhesion properties and has excellent processability and mechanical strength with a good balance.

9 Claims, No Drawings

POLYPROPYLENE RESIN COMPOSITIONS

FIELD OF THE INVENTION

The present invention relates to resin compositions mainly comprising polypropylene, which exhibit excellent coating adhesion properties and have excellent processability and mechanical strength with a good balance.

BACKGROUND OF THE INVENTION

Polypropylene resin is used in various fields, such as fields of miscellaneous goods for daily use, kitchen utensils, packaging films, automotive parts, mechanical parts and electrical parts, as a molding material for them, and this resin is practically used in the form of a composition further containing various compounding agents and additives which are added according to the properties required for each commercial product. For example, in fields where mechanical strength is required, such as a field of automotive exterior trim, polypropylene resin compositions in which elastomer, talc and the like are added are employed.

On the other hand, it is regarded as important that the automotive exterior trim has a united impression with automotive body in design, and to meet this, the same color coating as that for the body has been carried out on the molded articles. Polypropylene, however, is poor in the coating properties, so that primer coating and drying are necessary. Also from the viewpoints of VOC reduction and energy saving in recent years, polypropylene resin compositions capable of omitting the primer coating process have been desired.

As a method for imparting favorable coating adhesion properties to a polypropylene resin without performing primer coating of the polypropylene resin, Japanese Patent Publication No. 64660/1993 (Japanese Patent Laid-Open Publication No. 272255/1986) describes a method of mixing polypropylene having been modified with an organic compound having a hydroxyl group. However, if favorable coating adhesion properties are intended to be maintained, the strength inherent in the polypropylene resin tends to lower.

To solve such a problem, the following means have been proposed. For example, Japanese Patent Laid-Open Publication No. 41276/1996 describes, as a coating propylene resin composition capable of maintaining a balance of high mechanical strength (rigidity, impact resistance) and excellent molding processability, a composition comprising a propylene/ethylene block copolymer, a styrene elastomer or an ethylene/butene-1 bipolymer rubber, a modified propylene polymer having been grafted with maleic anhydride or a hydroxyl group-containing maleic anhydride derivative having a specific structure, and a filler, wherein the modified propylene polymer contained is a modified propylene polymer obtained by thermally oxidizing a propylene/ethylene random copolymer having a number-average molecular weight of 7,000 and an ethylene content of 3% by weight, grafting maleic anhydride in an amount of 10% by weight based on the whole amount by the use of an azo type radical initiator and then subjecting the resulting polymer to secondary modification with ethanolamine. Especially in the case where a balance between high rigidity and impact resistance and coating adhesion properties are obtained, however, there is substantially room for improvement in the molding processability.

Japanese Patent Laid-Open Publication No. 101891/1998 describes, as a resin composition which has high impact resistance and high coating properties and is not lowered in the impact strength after coating, a resin composition comprising a specific propylene/ethylene block copolymer, an ethylene/octene rubber, a triblock copolymer, a modified polyolefin polymer having a hydroxyl group, and talc, wherein the modified polyolefin polymer having a hydroxyl group contains 0.5 to 7% by weight of an unsaturated compound having a hydroxyl group and the modified polyolefin polymer is added in an amount of 0.5 to 20 parts by weight based on the whole amount of the composition. In this publication, moreover, a method for obtaining high impact resistance by the addition of a relatively small amount of modified polyolefin is proposed. However, especially when high impact resistance and coating adhesion properties are obtained, primer coating is substantially necessary.

From the viewpoint of VOC reduction in recent years, improvement of coating adhesion efficiency due to electrostatic coating has been made, and in the existing circumstances, use of a conductive primer generally makes it possible to perform electrostatic coating. In the use of a conductive primer, however, there is a problem of poor color development of the intermediate coating material, and also from the viewpoint of decrease of cost required for the coating process, it has been desired to omit the conductive primer coating process. That is to say, a polypropylene resin composition which can impart conductivity to a material used for a molded article to be coated and which exhibits favorable coating adhesion properties even if primer coating is not carried out is desired.

As a method to impart conductivity to a thermoplastic resin, filling of carbon black has been heretofore known, and with increase of a fill of carbon block, the conductivity becomes better, but the strength and the fluidity inherent in the thermoplastic resin tend to lower. To solve such a problem, the following means have been proposed. For example, Japanese Patent Laid-Open Publication No. 279310/1996 describes, as a conductive resin composition free of variability of the appearance of a molded product, mechanical strength and conductivity by the use of specific polypropylene, polyethylene and carbon black, an injection molded product comprising a master batch and a polypropylene resin in an amount of 60 to 200 parts by weight based on 100 parts by weight of the master batch, said master batch containing a polypropylene resin having a melt flow rate of 10 to 50 g/10 min in an amount of 50 to 90 parts by weight, a polyethylene resin having a density of not more than 0.910 g/cm$^3$ in an amount of 10 to 50 parts by weight and carbon black having a DBP oil absorption of 60 to 200 ml/100 g and a specific surface area of 30 to 200 m$^2$/g in an amount of 60 to 150 parts by weight based on 100 parts by weight of the total of both the resins.

Japanese Patent Laid-Open Publication No. 231824/2003 describes, as a conductive thermoplastic resin imparted with higher conductivity by the addition of a smaller amount of specific carbon black and having smaller variability of conductivity as compared with conventional carbon black, a high-conductivity thermoplastic resin composition containing carbon black having a micro pore width of 4.0 to 8.0 angstroms and a micro pore volume maximum value of 0.06 to 0.135 ml/angstrom/g.

Japanese Patent Laid-Open Publication No. 65064/1985 describes, as a high-conductivity carbon black-containing composition imparted with high conductivity and stability by the addition of specific carbon black, a high-conductivity carbon black-containing composition comprising 30 to 97% by weight of a synthetic resin or a synthetic rubber and 70 to 3% by weight of high-conductivity carbon black which has a DBP oil absorption of not less than 350 ml/100 g and is prepared simultaneously with formation of a synthetic gas by a process comprising subjecting liquid hydrocarbon to partial oxidation reaction with molecular oxygen and water vapor in a furnace, in said process a weight ratio of carbon atom/hydrogen atom in the hydrocarbon being not less than 9 and the furnace being operated under the conditions of a furnace internal temperature range of 1300 to 1450° C., a furnace internal pressure of 25 to 80 kg/cm$^2$ and an amount of water vapor fed to the furnace of 400 to 800 kg based on 1 ton of the hydrocarbon.

In the fields where high qualities are desired, such as a field of automotive exterior trim, however, further improvement in a balance among processability, mechanical strength and conductivity is necessary.

OBJECT OF THE INVENTION

It is an object of the present invention to provide a polypropylene resin composition which exhibits excellent mechanical strength and fluidity, has improved coating adhesion properties and is capable of producing molded articles exhibiting excellent coating adhesion properties.

It is another object of the present invention to provide a polypropylene resin composition which exhibits excellent coating adhesion properties and conductivity and has excellent processability and mechanical strength with a good balance.

SUMMARY OF THE INVENTION

The polypropylene resin composition according to the present invention is a polypropylene resin composition comprising:

(A) (a-1) a crystalline propylene/ethylene block copolymer or (a-3) a polymer mixture comprising (a-1) the crystalline propylene/ethylene block copolymer and (a-2) a crystalline propylene homopolymer, in an amount of 5 to 56% by weight, (B) a hydroxyl group-containing polypropylene in an amount of 10 to 45% by weight, (C) a copolymer rubber of ethylene and an α-olefin, in an amount of 0.18 to 25% by weight, (D) a hydrogenation product of a block copolymer containing a polymer block of a monovinyl-substituted aromatic hydrocarbon compound and a polymer block of a conjugated diene compound, in an amount of 1 to 10% by weight, and (E) an inorganic filler in an amount of 15 to 25% by weight, the total amount of said components (A), (B), (C), (D) and (E) being 100% by weight, wherein:

the crystalline propylene/ethylene block copolymer (a-1) comprises a propylene homopolymer portion and a propylene/ethylene random copolymer portion and has a melt flow rate (ASTM D-1238, 230° C., load of 2160 g) of 70 to 130 g/10 min, said propylene homopolymer portion having an isotactic pentad fraction (mmmm fraction), as measured by $^{13}$C-NMR, of not less than 97%, a content of said propylene/ethylene random copolymer portion being in the range of 5 to 20% by weight, the crystalline propylene homopolymer (a-2) has an isotactic pentad fraction (mmmm fraction) of not less than 97% by weight and a melt flow rate (ASTM D-1238, 230° C., load of 2160 g) of 100 to 300 g/10 min, the polymer mixture (a-3) comprises 50 to 99% by weight of the crystalline propylene/ethylene block copolymer (a-1) and 1 to 50% by weight of the crystalline propylene homopolymer (a-2), the total amount of said components (a-1) and (a-2) being 100% by weight, the hydroxyl group-containing polypropylene (B) has an intrinsic viscosity [η], as measured in decalin at 135° C., of 0.8 to 2.0 dl/g and a melting point, as detected by a differential scanning calorimeter, of 150 to 168° C., the copolymer rubber (C) has a melt flow rate (ASTM D-1238, 230° C., load of 2160 g) of 0.5 to 15 g/10 min, and hydroxyl group-containing monomer units derived from the hydroxyl group-containing polypropylene (B) are contained in amounts of 1.3 to 4.0% by weight in 100% by weight of the polypropylene resin composition.

The polypropylene resin composition further comprises (F) conductive carbon black in an amount of 1 to 15% by weight, in addition to 5 to 55% by weight of the component (A), 10 to 45% by weight of the component (B), 18 to 25% by weight of the component (C), 1 to 10% by weight of the component (D) and 15 to 25% by weight of the component (E), the total amount of said components (A), (B), (C), (D), (E) and (F) being 100% by weight.

The conductive carbon black (F) preferably has a DBP oil absorption of 300 to 500 ml/100 g and is preferably contained in an amount of 1 to 10% by weight in the polypropylene resin composition.

The hydroxyl group-containing polypropylene (B) is preferably hydroxyl group-containing polypropylene obtained by melt kneading a mixture containing an ultrahigh molecular weight crystalline polypropylene resin having a melting point, as measured by a differential scanning calorimeter, of 150 to 168° C. and an intrinsic viscosity [η], as measured in decalin at 135° C., of 5 to 15 dl/g, a hydroxyl group-containing monomer in an amount of 0.3 to 10 parts by weight and an organic peroxide in an amount of 0.001 to 10 parts by weight, each of said amounts being based on 100 parts by weight of the ultrahigh molecular weight crystalline polypropylene resin.

The hydroxyl group-containing polypropylene (B) is preferably 2-hydroxyethyl methacrylate-modified polypropylene.

The copolymer rubber (C) of ethylene and an α-olefin is preferably a copolymer rubber of ethylene and an α-olefin of 6 or more carbon atoms.

The hydrogenation product (D) of a block copolymer is preferably a styrene/ethylene/butene/styrene block copolymer, a styrene/ethylene/propylene/styrene block copolymer or a styrene/ethylene/propylene block copolymer.

The inorganic filler (E) is preferably talc.

The polypropylene resin composition preferably has a melt flow rate (ASTM D-1238, 230° C., load of 2160 g) of 10 to 70 g/10 min, a flexural modulus (ASTM D-790) of 1400 to 2800 MPa and a brittle temperature (ASTM D-746) of −10 to −40° C.

DETAILED DESCRIPTION OF THE INVENTION

Best modes of the polypropylene resin composition of the invention and the components to constitute the resin composition are described in detail hereinafter.

Polypropylene Resin Composition

The polypropylene resin composition of the invention comprises:

(1) (A) (a-1) a crystalline propylene/ethylene block copolymer or (a-3) a polymer mixture comprising (a-1) the crystalline propylene/ethylene block copolymer and (a-2) a crystalline propylene homopolymer, in an amount of 5 to 56% by weight, preferably 10 to 50% by weight, (2) (B) a hydroxyl group-containing polypropylene in an amount of 10 to 45% by weight, preferably 15 to 45% by weight, (3) (C) a copolymer rubber of ethylene and an α-olefin, in an amount of 18 to 25% by weight, preferably 19 to 23% by weight, (4) (D) a hydrogenation product of a block copolymer containing a polymer block of a monovinyl-substituted aromatic hydrocarbon compound and a polymer block of a conjugated diene compound, in an amount of 1 to 10% by weight, preferably 3 to 7% by weight, and (5) (E) an inorganic filler in an amount of 15 to 25% by weight, preferably 18 to 23% by weight.

The total amount of the above five components is 100% by weight. In 100% by weight of the polypropylene resin composition, hydroxyl group-containing monomer units derived from the hydroxyl group-containing polypropylene (B) are contained in amounts of 1.3 to 4.0% by weight, preferably 1.4 to 3.0% by weight.

The polypropylene resin composition having the above Compositional ratio not only has excellent fluidity in the molding process but also exhibits favorable coating adhesion properties. Moreover, the polypropylene resin composition is excellent in various properties such as flexural modulus, impact resistance, rigidity and brittle temperature and has a good balance among them. Therefore, this resin composition can be favorably used as a material resin for injection molding, exhibits excellent moldability in the injection molding process, and can readily produce injection molded articles having excellent dimensional stability.

The polypropylene resin composition of the invention may comprise:

(1) (A) (a-1) a crystalline propylene/ethylene block copolymer or (a-3) a polymer mixture consisting of (a-1) the crystalline propylene/ethylene block copolymer and (a-2) a crystalline propylene homopolymer, in an amount of 5 to 55% by weight, preferably 10 to 50% by weight, (2) (B) a hydroxyl group-containing polypropylene in an amount of 10 to 45% by weight, preferably 15 to 45% by weight, (3) (C) a copolymer rubber of ethylene and an α-olefin, in an amount of 18 to 25% by weight, preferably 19 to 23% by weight, (4) (D) a hydrogenation product of a block copolymer containing a polymer block of a monovinyl-substituted aromatic hydrocarbon compound and a polymer block of a conjugated diene compound, in an amount of 1 to 10% by weight, preferably 3 to 7% by weight, (5) (E) an inorganic filler in an amount of 15 to 25% by weight, preferably 18 to 23% by weight, and (6) (F) a conductive carbon black in an amount of 1 to 15% by weight, preferably 1 to 14% by weight, more preferably 1.5 to 10% by weight.

The total amount of the above six components is 100% by weight. In 100% by weight of the polypropylene resin composition, hydroxyl group-containing monomer units derived from the hydroxyl group-containing polypropylene (B) are contained in amounts of 1.3 to 4.0% by weight, preferably 1.4 to 3.0% by weight.

The polypropylene resin composition of the above compositional ratio exhibits favorable coating adhesion properties and conductivity, and has excellent fluidity in the molding process. Moreover, the polypropylene resin composition is excellent in various properties such as flexural modulus, impact resistance, rigidity and brittle temperature and has a good balance among them. Therefore, this resin composition can be favorably used as a material resin for injection molding, exhibits excellent moldability in the injection molding process, and can readily produce injection molded articles having excellent dimensional stability.

When the polypropylene resin composition of the invention is a system which does not contain the component (B), namely, a polypropylene resin composition comprising the component (A), the component (C), the component (D), the component (E) and the component (F), this resin composition has excellent mechanical properties and conductivity, so that the resin composition is favorably used in, for example, an automotive exterior trim coating field where particularly high adhesion properties are not required. In this case, the resin composition desirably comprises 30 to 65% by weight, preferably 35 to 60% by weight of the component (A), 18 to 25% by weight, preferably 19 to 23% by weight of the component (C), 1 to 10% by weight, preferably 3 to 7% by weight of the component (D), 15 to 25% by weight, preferably 18 to 23% by weight of the component (E), and 1 to 10% by weight, preferably 2 to 7% by weight of the component (F), with the proviso that the total amount of the components (A), (C), (D), (E) and (F) is 100% by weight.

Of the polypropylene resin compositions mentioned above, a composition satisfying the following properties is preferable as a material component for forming a resin composition for automotive parts.

(1) The melt flow rate (MFR, ASTM D-1238, 230° C., load of 2160 g) is in the range of preferably 10 to 70 g/10 min, more preferably 12 to 70 g/10 min.

(2) The flexural modulus (ASTM D-790) is in the range of preferably 1400 to 2800 MPa, more preferably 1450 to 2600 MPa.

(3) The brittle temperature (ASTM D-746) is in the range of preferably −10 to −40° C., more preferably −20 to −38° C.

Component (A)

In the present invention, (a-1) a crystalline propylene/ethylene block copolymer is used alone or (a-3) a polymer mixture comprising (a-1) the crystalline propylene/ethylene block copolymer and (a-2) a crystalline propylene homopolymer is used, as the component (A).

The crystalline propylene/ethylene block copolymer (a-1) comprises a propylene homopolymer portion and a propylene/ethylene random copolymer portion. The content of the propylene homopolymer portion is in the range of 80 to 95% by weight, preferably 87 to 92% by weight, and the content of the propylene/ethylene random copolymer portion is in the range of 5 to 20% by weight, preferably 8 to 13% by weight, with the proviso that the total amount of both the portions is 100% by weight.

The content of each of the above portions can be determined from the results of fractionation of a block copolymer sample, said fractionation being carried out at room temperature using p-xylene as a solvent. One example of the measuring method is as follows. First, 5 g of a block copolymer sample is completely dissolved in boiling p-xylene. Thereafter, the resulting solution is cooled to 20° C., allowed to stand still for one day and night, and filtered to separate an insoluble portion. Then, to the filtrate is added 1500 ml of methanol, and they are stirred, whereby a soluble portion separates as a precipitate. The precipitate is filtered off and dried to yield a p-xylene-soluble portion. Since the soluble portion corresponds to a propylene/ethylene random copolymer portion, it is weighed, whereby a content of the propylene/ethylene random copolymer portion is determined.

The propylene homopolymer portion has an isotactic pentad fraction (mmmm fraction), as measured by $^{13}$C-NMR, of not less than 97%, preferably not less than 97.5%. The term "isotactic pentad fraction (mmmm fraction)" means a proportion of isotactic sequences in the pentad units of the crystalline polypropylene molecular chains, which is measured by the use of $^{13}$C-NMR. More specifically, the isotactic pentad fraction is determined as a ratio of absorption peaks of propylene monomer units in a $^{13}$C-NMR spectrum, each of said propylene monomer units being present at the center of a sequence of 5 propylene monomer units which are continuously meso-bonded, to all the absorption peaks in the methyl carbon region. The propylene homopolymer portion has MFR (230° C., load of 2160 g) of 100 to 300 g/10 min, preferably 120 to 250 g/10 min.

The propylene/ethylene random copolymer portion has an intrinsic viscosity [η], as measured in decalin at 135° C., of preferably 6 to 9 dl/g, and the ethylene content in this portion is in the range of preferably 20 to 40% by weight, more preferably 24 to 32% by weight.

In the block copolymer (a-1), the content of ethylene units is in the range of preferably 1 to 10% by weight, more preferably 3 to 8% by weight. The content of ethylene units in the block copolymer (a-1) can be determined by subjecting a pressed film of a sample of the block copolymer (a-1) to infrared absorption spectrum analysis. That is to say, an absorbance based on the methyl group at 1155 cm$^{-1}$ and an absorbance based on the methylene group are measured, and using a Gardner's calibration curve, the content of ethylene units is measured (I. J. Gardner et al, Rubber Chem. And Tech., 44, 1015, 1971).

As the crystalline propylene/ethylene block copolymer (a-1), one having a melt flow rate (MFR, 230° C., load of 2160 g), as measured in accordance with ASTM D-1238, of 70 to 130 g/10 min, preferably 80 to 120 g/10 min, is used. If a block copolymer having MFR of less than the lower limit of the above range is used, flow mark or weld mark is liable to occur on the surface of a molded article produced from the finally obtained polypropylene resin composition, and the molded article has a high heat shrinkage ratio, so that such MFR is undesirable. The crystalline propylene/ethylene block copolymer (a-1) may be used singly or in combination.

In the present invention, instead of using the crystalline propylene/ethylene block copolymer (a-1) alone, a polymer mixture (a-3) comprising the crystalline propylene/ethylene block copolymer (a-1) and a crystalline propylene homopolymer (a-2) may be employed.

The polymer mixture (a-3) comprises 50 to 99% by weight of the crystalline propylene/ethylene block copolymer (a-1) and 1 to 50% by weight of the crystalline propylene homopolymer (a-2), and preferably comprises 60 to 90% by weight of the crystalline propylene/ethylene block copolymer (a-1) and 10 to 40% by weight of the crystalline propylene homopolymer (a-2).

The crystalline propylene homopolymer (a-2) has an isotactic pentad fraction of preferably not less than 97%, more preferably not less than 97.5%, and has a melt flow rate (MFR, 230° C., load of 2160 g) of 100 to 300 g/10 min, preferably 120 to 250 g/10 min.

The crystalline propylene/ethylene block copolymer (a-1) can be prepared by various processes, and for example, it can be prepared by the use of a stereoregular olefin polymerization catalyst publicly known, such as a Ziegler-Natta catalyst or a metallocene catalyst.

An example of the process for preparing the block copolymer (a-1) using a Ziegler-Natta catalyst is a process comprising polymerizing propylene in the presence of a catalyst formed from a solid titanium catalyst component, an organometallic compound catalyst component, and if necessary, an electron donor, and then copolymerizing propylene and ethylene. Also the crystalline propylene homopolymer (a-2) that is employable together with the crystalline propylene/ethylene block copolymer (a-1) can be prepared by the use of the same stereoregular olefin polymerization catalyst as above.

Component (B)

The hydroxyl group-containing polypropylene (B) for use in the invention has an intrinsic viscosity [η], as measured in decalin at 135° C., of 0.8 to 2.0 dl/g, preferably 0.8 to 1.8 dl/g, more preferably 0.9 to 1.5 dl/g, and has a melting point, as detected by a differential scanning calorimeter, of 150 to 168° C., preferably 152 to 167° C. If the intrinsic viscosity [η] as measured in decalin at 135° C. is less than 0.8 dl/g, the impact resistance sometimes becomes insufficient. If the intrinsic viscosity exceeds 2.0 dl/g, favorable fluidity is not obtained, and the molding processability sometimes becomes insufficient. If the melting point as detected by a differential scanning calorimeter is lower than 150° C., the rigidity or the heat-resistant rigidity sometimes becomes insufficient.

Although the process for preparing the hydroxyl group-containing polypropylene (B) is not specifically restricted, preferable is a process comprising melt kneading a mixture containing a polypropylene resin, a hydroxyl group-containing monomer and an organic peroxide. The polypropylene resin used in the process comprising melt kneading is preferably an ultrahigh molecular weight crystalline polypropylene resin having a melting point, as measured by a differential scanning calorimeter, of 150 to 168° C., preferably 152 to 167° C. and an intrinsic viscosity [η], as measured in decalin at 135° C., of 5 to 15 dl/g, more preferably 5.5 to 12 dl/g. The amount of the hydroxyl group-containing monomer is preferably in the range of 0.3 to 10 parts by weight, more preferably 2.8 to 8 parts by weight, and the amount of the organic peroxide is preferably in the range of 0.001 to 10 parts by weight, more preferably 0.01 to 5 parts by weight, each amount being based on 100 parts by weight of the polypropylene resin.

Examples of the hydroxyl group-containing monomers used for the hydroxyl group-containing polypropylene include (meth)acrylates, such as 2-hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerol mono(meth)acrylate, pentaerythritol mono(meth)acrylate, trimethylolpropane (meth)acrylate, tetramethylolethane mono(meth)acrylate, butanediol mono(meth)acrylate, polyethylene glycol mono(meth)acrylate and 2-(6-hydroxyhexanoyloxy)ethyl acrylate. The term "(meth)acrylate" means "acrylate" and/or "methacrylate". Of the above hydroxyl group-containing monomers, preferable are 2-hydroxyethyl (meth)acrylate and 2-hydroxypropyl (meth)acrylate.

The hydroxyl group-containing monomers can be used singly or in combination.

As the organic peroxide, any of organic peroxides publicly known may be used without restriction. Examples of such organic peroxides include peroxy ketals, such as 1,1-bis(t-butylperoxy)-3,3,5-trimethylcyclohexane, 1,1-bis(t-butylperoxy)cyclohexane, 2,2-bis(t-butylperoxy) octane, n-butyl-4,4-bis(t-butylperoxy)valerate and 2,2-bis(t-butylperoxy)butane; dialkyl peroxides, such as di-t-butyl peroxide, dicumyl peroxide, t-butylcumyl peroxide, α,α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides, such as acetyl peroxide, isobutyl peroxide, octanoyl peroxide, decanoyl peroxide, lauroyl peroxide, 3,5,5-trimethylhexanoyl peroxide, benzoyl peroxide, 2,5-dichlorobenzoyl peroxide and m-toluoyl peroxide; peroxy esters, such as t-butyl oxyacetate, t-butyl peroxyisobutyrate, t-butyl peroxy-2-ethylhexanoate, t-butyl peroxylaurate, t-butyl peroxybenzoate, di-t-butyl peroxyisophthalate, 2,5-dimethyl-2,5-bis(benzoylperoxy)hexane, t-butylperoxymaleic acid, t-butyl peroxyisopropylcarbonate and cumyl peroxyoctate; peroxy dicarbonates, such as di(2-ethylhexyl) peroxydicarbonate and di(3-methyl-3-methoxybutyl) peroxydicarbonate; and hydroperoxides, such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide. Of these, preferable are benzoyl peroxide, m-toluoyl peroxide, t-butyl peroxy-2-ethylhexanoate, dicumyl peroxide, 2,5-dimethyl-2,5-bis(t-butylperoxy)hexane and t-butyl peroxybenzoate. These organic peroxides can be used singly or in combination.

In order to prepare the hydroxyl group-containing polypropylene, publicly known various processes for mixing resins with each other or mixing a resin with a solid or liquid additive are adoptable. A preferred example is a process comprising mixing all the components together or the components in some combinations separately by the use of a Henschel mixer, a ribbon blender, a blender or the like to prepare a homogeneous mixture and then kneading the mixture. For kneading, conventionally known various kneading means, such as a Banbury mixer, a plastomill, a Brabender Plastograph and a single-screw or twin-screw extruder, are widely adoptable. In the kneading using a kneading device, the temperature (e.g., cylinder temperature in case of extruder) is in the range of 100 to 300° C., preferably 160 to 250° C. If the temperature is too low, graft quantity is not increased in some cases. If the temperature is too high, decomposition of a resin sometimes takes place. The kneading time is in the range of 0.1 to 30 minutes, preferably 0.5 to 5 minutes. If the kneading time is too short, sufficient graft quantity is not obtained in some cases. If the kneading time is too long, decomposition of a resin sometimes takes place.

The hydroxyl group-containing polypropylene may contain various additives, for example, antioxidants of phenol type, sulfur type and phosphorus type, lubricants, antistatic agents, dispersants, copper inhibitors, neutralizing agents, foaming agents, plasticizers, anti-foaming agents, flame retardants, crosslinking agents, fluidity improvers such as peroxides, ultraviolet light absorbers, and light stabilizers.

Component (C)

The ethylene/α-olefin copolymer rubber (C) for use in the invention is not specifically restricted in its type, but a preferred embodiment is the following polymer. That is to say, there can be mentioned an ethylene/α-olefin copolymer rubber having an ethylene content of 20 to 95% by mol and an α-olefin (having 3 to 20 carbon atoms) content of 80 to 5% by mol, preferably having an ethylene content of 30 to 90% by mol and an α-olefin (having 3 to 20 carbon atoms) content of 10 to 70% by mol. The ethylene/α-olefin copolymer rubber (C) has MFR of 0.5 to 15 g/10 min, preferably 1 to 15 g/10 min.

Examples of the α-olefins of 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. These α-olefins can be used singly or in combination. Of these, preferable are α-olefins of 3 to 12 carbon atoms, such as propylene, 1-butene, 1-hexene and 1-octene, and more preferable are α-olefins of 6 to 12 carbon atoms, such as 1-octene.

An example of the copolymer rubber (C) of ethylene and an α-olefin of 6 or more carbon atoms is an ethylene/1-octene copolymer rubber.

An ethylene/α-olefin/non-conjugated polyene copolymer rubber having an ethylene content of 20 to 95% by mol, an α-olefin (having 3 to 20 carbon atoms) content of 3 to 70% by mol and a non-conjugated polyene content of 2 to 20% by mol, preferably having an ethylene content of 40 to 90% by mol, an α-olefin (having 3 to 20 carbon atoms) content of 10 to 60% by mol and a non-conjugated polyene content of 3 to 15% by mol, can be added when needed, unless the objects of the present invention are affected. The ethylene/α-olefin/non-conjugated polyene copolymer rubber has MFR of preferably 0.01 to 20 g/10 min, more preferably 0.05 to 20 g/10 min.

Examples of the α-olefins of 3 to 20 carbon atoms include the same α-olefins as previously described for the ethylene/α-olefin copolymer rubber (C). Examples of the non-conjugated polyenes include acyclic dienes, such as 5-ethylidene-2-norbornene, 5-propylidene-5-norbornene, dicyclopentadiene, 5-vinyl-2-norbornene, 5-methylene-2-norbnornene, 5-isopropylidene-2-norbornene and norbornadiene; chain non-conjugated dienes, such as 1,4-hexadiene, 4-methyl-1,4-hexadiene, 5-methyl-1,4-hexadiene, 5-methyl-1,5-heptadiene, 6-methyt-1,5-heptadiene, 6-methyl-1,7-octadiene and 7-methyl-1,6-octadiene; and trienes, such as 2,3-diisopropylidene-5-norbornene. These non-conjugated polyenes can be used singly or in combination. Of these, preferable are 1,4-hexadiene, dicyclopentadiene and 5-ethylidene-2-norbornene.

The ethylene/α-olefin/non-conjugated polyene random copolymer has MFR (ASTM D-1238, 230° C., load of 2160 g) of preferably not more than 1 g/10 min, more preferably 0.1 to 0.5 g/10 min. When an ethylene/α-olefin/non-conjugated polyene random copolymer having MFR of this range is used, occurrence of flow mark or weld mark on the surface of a molded article produced from the finally obtained resin composition can be avoided.

In the ethylene/α-olefin/non-conjugated polyene random copolymer, the copolymerization ratio of ethylene to an α-olefin is in the range of preferably 90/10 to 40/60, more preferably 85/15 to 50/50, in terms of an ethylene/α-olefin molar ratio.

The proportion of the non-conjugated polyene component is in the range of preferably 1 to 40, more preferably 2 to 35, in terms of an iodine value of the random copolymer. Typical examples of the ethylene/α-olefin/non-conjugated polyene random copolymers include an ethylene/propylene/diene terpolymer (EPDM) and an ethylene/1-butene/diene terpolymer.

The ethylene/α-olefin copolymer rubber (C) can be prepared by copolymerizing ethylene and an α-olefin using a stereoregular olefin polymerization catalyst. In particular, an ethylene/α-olefin copolymer prepared by the use of a single site catalyst has a narrow molecular weight distribution and a narrow composition distribution, so that it exhibits excellent effect in the improvement of low-temperature impact strength. An example of such a single site catalyst is a metallocene catalyst containing a metallocene compound wherein a compound having cyclopentadiene skeleton is coordinated to a transition metal such as a zirconium metal, and an organoaluminum oxy-compound.

The hydrogenation product (D) of a block copolymer containing a polymer block of a monovinyl-substituted aromatic hydrocarbon compound and a polymer block of a conjugated diene compound, which is used in the invention, is a hydrogenation product obtained by hydrogenating the Y part of a block copolymer represented by the following formula (1) or (2):

X-Y                                     (1)

X(-Y-X)$_n$                               (2)

wherein X is a polymer block of monovinyl-substituted aromatic hydrocarbon, Y is a conjugated diene polymer block, and n is an integer of 1 to 5, preferably 1 or 2.

Examples of the monovinyl-substituted aromatic hydrocarbons to constitute the polymer block indicated by X in the formula (1) or (2) include styrene and styrene derivatives, such as α-methylstyrene, p-methylstyrene, chlorostyrene, lower alkyl-substituted styrene and vinylnaphthalene. These monovinyl-substituted aromatic hydrocarbons may be used singly or in combination. Of these, particularly preferable is styrene.

Examples of the conjugated dienes to constitute the polymer block indicated by Y in the formula (1) or (2) include butadiene, isoprene and chloroprene. These conjugated dienes may be used singly or in combination. Of these, particularly preferable are butadiene and isoprene. When butadiene is used as the conjugated diene, the proportion of 1,2-bonds in the polybutadiene block is in the range of preferably 20 to 80% by weight, more preferably 30 to 60% by weight.

In the hydrogenation product (D) of a block copolymer, the hydrogenation ratio of the conjugated diene polymer block (Y part) is preferably not less than 90% by mol, more preferably not less than 95% by mol, and in the block copolymer, the content of the X part is in the range of preferably 10 to 25% by weight. The hydrogenation product (D) of a block copolymer has MFR (ASTM D-1238, 230° C., load of 2160 g) of preferably not more than 15 g/10 min, more preferably 1 to 10 g/10 min. When a block copolymer having an X part content of the above range is used, a molded article produced from the finally obtained resin composition has a low heat shrinkage ratio and a low brittle temperature.

Examples of the hydrogenation products (D) of block copolymers include styrene block copolymers, such as a styrene/ethylene/butene/styrene block copolymer (SEBS) obtained by hydrogenation of a styrene/butadiene/styrene triblock copolymer, a styrene/ethylene/propylene/styrene block copolymer (SEPS) obtained by hydrogenation of a styrene/isoprene/styrene triblock copolymer, and a styrene/ethylene/propylene block copolymer (SEP) obtained by hydrogenation of a styrene/isoprene diblock copolymer.

The block copolymer that has not been subjected to hydrogenation can be prepared by, for example, subjecting monomers to block copolymerization in an inert solvent in the presence of a lithium catalyst or a Ziegler catalyst. The preparation process is described in detail in, for example, Japanese Patent Publication No. 23798/1965. Hydrogenation of the conjugated diene polymer block can be carried out by hydrogenating the block copolymer in an inert solvent in the presence of a hydrogenation catalyst publicly known. The process for the hydrogenation is described in detail in, for example, Japanese Patent Publications No. 8704/1967, No. 6636/1968 and No. 20814/1971.

The hydrogenated block copolymers (D) may be those available under the trade names of Crayton G1657 (product of Crayton Polymers Japan K.K.), Septon 2004 (product of Kuraray Co., Ltd.), Toughtec H1052 and Toughtec H1062 (products of Asahi Kasei Chemicals Corporation), etc.

Component (E)

Examples of the inorganic fillers (E) for use in the invention include talc, clay, calcium carbonate, mica, silicates, carbonates and glass fibers. Of these, talc is particularly preferable. As the talc, one having an average particle diameter, as measured by laser analysis, of 1 to 10 μm, preferably 2 to 6 μm, is desirable. The inorganic fillers may be used singly or in combination.

Component (F)

The conductive carbon black (F) for use in the invention is, for example, furnace black and acetylene black. Such carbon black can be properly selected from commercial products. For example, "Ketchen Black EC" or "Ketchen Black EC600JD" (available from Lion Corporation) is employable as the furnace black, and "Denka Black" (available from Denki Kagaku Kogyo K.K.) is employable as the acetylene black. The carbon black may be used in combination.

From the viewpoint of a balance between conductivity and fluidity of the polypropylene resin composition, the DBP oil absorption of the conductive carbon black is in the range of preferably 100 to 500 ml/100 g, more preferably 150 to 500 ml/100 g, particularly preferably 300 to 500 ml/100 g.

In order to enhance filling abilities in the resin, the conductive carbon black may be subjected to surface treatment unless the objects of the present invention are affected. In the surface treatment, for example, a titanate type or aluminum type surface treating agent is employable.

The polypropylene resin composition of the invention contains hydroxyl group-containing monomer units derived from the hydroxyl group-containing polypropylene (B) in an amount of 1.3 to 4.0% by weight, preferably 1.4 to 3.0% by weight. If the content of the hydroxyl group-containing monomer units is less than 1.3% by weight, the coating adhesion properties sometimes become insufficient. If the content thereof exceeds 4.0% by weight, the rigidity or the heat-resistant rigidity sometimes becomes insufficient.

For preparing the polypropylene resin composition of the invention, a process comprising melt kneading the components (a-1), (a-2), (a-3), (B), (C), (D), (E) and (F) by the use of a kneading device, such as a Banbury mixer, a single-screw extruder or a twin-screw extruder is available.

In the case where pellets of a mixture of the components (a-1), (a-2), (a-3), (B), (C), (D), (E) and (F) (polypropylene resin composition pellets) are obtainable, the polypropylene resin composition of the invention can be prepared by melt kneading the polypropylene resin composition pellets and additives that are optionally used, by means of a mixing device, such as a Banbury mixer, a single-screw extruder or a twin-screw extruder. In the mixing process, the components (a-1), (a-2), (a-3), (B), (C), (D), (E) and (F) and the additives optionally used may be mixed in any order or mixed at the same time, or a multi-step mixing process wherein some components are mixed and then other components are mixed is also adoptable.

In the resin composition of the invention, colorants such as carbon black and titanium oxide can be used in combination with the above components. In addition, additives, such as heat stabilizer, antistatic agent, weathering stabilizer, light stabilizer, anti-aging agent, antioxidant, ultraviolet light absorber, softener, dispersant and lubricant, can be added when needed, unless the objects of the present invention are affected.

The resin composition can be favorably used for producing automotive parts, particularly automotive exterior trim, such as bumper, overfender, side mole and locker mole.

Effect of the Invention

According to the polypropylene resin composition of the present invention, hydroxyl groups are dispersed in the composition, and hence, a molded article produced from the final resin composition has a surface of excellent coating adhesion properties. The polypropylene resin composition having excellent properties and coating adhesion properties can be used for automotive exterior coated parts without performing primer coating.

Further, according to the propylene resin composition of the present invention, a molded article therefrom exhibits excellent coating adhesion properties and conductivity. Therefore, surface decoration by electrostatic coating can be carried out without performing conductive primer coating. In addition, because of an excellent balance between fluidity and mechanical properties, the polypropylene resin composition of the invention can be favorably used for automotive exterior coated parts.

Moreover, the resin composition of the invention has excellent mechanical strength as observed in the flexural modulus and the Izod impact strength and has high fluidity as observed in the spiral flow length, so that weight reduction of parts due to thin-wall molding or shortening of molding cycle in the injection molding can be achieved. Therefore, the resin composition is favorably used for producing automotive parts, particularly exterior molded articles.

EXAMPLES

The present invention is further described with reference to the following examples, but it should be construed that the invention is in no way limited to those examples.

Various properties of the polypropylene resin compositions used in the examples and the comparative examples were measured in the following manner.

(1) Melt Flow Rate

The melt flow rate was measured at 230° C. under a load of 2160 g in accordance with ASTM D-1238.

(2) Tensile Elongation at Break

The tensile elongation at break was measured using an ASTM-#1 specimen in accordance with ASTM D-638.

(3) Flexural Modulus

The flexural modulus was measured using a specimen having a thickness of ¼ inch in accordance with ASTM D-790.

(4) Izod Impact Strength

The Izod impact strength was measured using a notched specimen having a thickness of ¼ inch in accordance with ASTM D-256.

(5) Load Deflection Temperature

The load deflection temperature was measured under a load of 0.45 MPa in accordance with ASTM D-648.

(6) Brittle Temperature

The brittle temperature was measured in accordance with ASTM D-746.

(7) Volume Resistivity

From an injection molded flat plate (thickness: 3 mm, 150 cm×150 cm), a strip having a width of 12.7 mm was cut out, and the strip was freeze ruptured so as to give a specimen of 50 mm. Both ends of the rupture cross-section were coated with a silver paste, and a voltage of 100 V was applied to the both ends to measure a resistivity by means of a Yokogawa Electric Corporation 2426A digital electric insulation meter. Using the measured value, a volume resistivity was calculated from the following formula.

$$\text{Volume resistivity } (\Omega \cdot cm) = R \times W/L \times t$$

wherein R is a resistivity given when a voltage of 100 V is applied, W is a width (cm) of a specimen, L is a length of a specimen, and t is a thickness of a specimen.

(8) Spiral Flow Length

Using a resin flow length measuring mold with a spiral flow path having a thickness of 3 mm, a width of 10 mm and a length of 2000 mm, a resin composition was molded at a resin temperature of 230° C. A flow length (mm) of the resulting molded article was measured, and the measured length was taken as a spiral flow length.

(9) Specific Gravity

The specific gravity was measured in accordance with ASTM D-792.

(10) Coating Adhesion Test

Using a Japan Steel Works J100-EP type injection molding machine, a square plate of 140 mm×70 mm×3 mm was prepared. The square plate was wiped with a pure water-impregnated paper waste and then coated with the following coating material. In Examples 1 and 2 and Comparative Examples 1 to 4, a Nippon Bee Chemical R333 type urethane resin coating material was applied, and in Examples 3 to 6 and Comparative Example 5, a Nippon Bee Chemical KX0021 type aqueous urethane resin coating material was applied, by means of an air gun so that the dry film thickness should become 15 μm. Thereon, in Examples 1 and 2 and Comparative Examples 1 to 4, a Nippon Bee Chemical R298-1 clear coating material was applied, and in Examples 3 to 6 and Comparative Example 5, a Nippon Bee Chemical KX0261 type clear coating material was applied, by means of an air gun-so that the dry film thickness should become 25 μm.

Thereafter, baking was carried out, in Examples 1 and 2 and Comparative Examples 1 to 4, at 100° C. for 20 minutes, and in Examples 3 to 6 and Comparative Example 5, at 120° C. for 20 minutes. Then, a specimen having cross-cuts formed by a cutter knife was prepared in accordance with JIS K5400, and a Nichiban cellophane tape was allowed to adhere onto the specimen, then rapidly pulled and thereby peeled off. The number of the squares where the coating film remained was counted, and the number was regarded as an indication of adhesion properties based on the following criteria.

AA: The coating film was not peeled.
BB: The coating film was partially peeled.
CC: The coating film was wholly peeled.

Various materials used in the examples and the comparative examples are described below.

(A) Crystalline Propylene/Ethylene Block Copolymer
  (a-1) Crystalline Propylene/Ethylene Block Copolymer
    MFR (230° C., 2160 g): 100 g/10 min
    Propylene homopolymer portion: 90% by weight
    Isotactic pentad fraction (mmmm fraction): 98%
    Propylene/ethylene random copolymer portion: 10% by weight
    Intrinsic viscosity [η]: 7.5 dl/g (value measured in decalin at 135° C.)
    Ethylene content: 26% by weight
  (a-2) Crystalline Propylene Homopolymer
    MFR (230° C., 2160 g): 220 g/10 min
    Isotactic pentad fraction (mmmm fraction): 98%

(B) Hydroxyl Group-containing Polypropylene
  MPP (1):
  To a polypropylene homopolymer resin having an intrinsic viscosity [η], as measured in decalin at 135° C., of 7.5 dl/g and a melting point, as detected by a differential scanning calorimeter, of 164° C., 2-hydroxyethyl methacrylate and t-butyl peroxybenzoate were added, and they were mixed by a Henschel mixer. The resulting mixture was melt kneaded by a vented twin-screw kneader at a cylinder temperature of 180° C. to perform graft copolymerization modification. Properties of the resulting hydroxyl group-containing polypropylene are set forth in Table 1. After the modification, the resin had an intrinsic viscosity [η], as measured in decalin at 135° C., of 1.0 dl/g, a melting point, as detected by a differential scanning calorimeter, of 162° C. and a hydroxyl group-containing monomer unit content, as calculated by infrared absorption analysis, of 3.6% by weight.

MPP (2):
  Graft copolymerization modification was carried out in the same manner as described for the MPP (1), except that the amounts of 2-hydroxyethyl methacrylate and t-butyl peroxybenzoate were controlled. Properties of the resulting hydroxyl group-containing polypropylene are set forth in Table 1. After the modification, the resin had an intrinsic viscosity [η], as measured in decalin at 135° C., of 0.8 dl/g, a melting point, as detected by a differential scanning calorimeter, of 152° C. and a hydroxyl group-containing monomer unit content, as calculated by infrared absorption analysis, of 3.8% by weight.

MPP (3):
  Hydroxyl group-containing low molecular weight polypropylene (trademark: Yumex 1210, available from Sanyo Chemical Industries, Ltd., polypropylene resin having an intrinsic viscosity [η], as measured in decalin at 135° C., of 0.3 dl/g, a melting point, as detected by a differential scanning calorimeter, of 137° C. and a hydroxyl group-containing monomer unit content, as calculated by infrared absorption analysis, of 12% by weight)

TABLE 1

|        | [η] (dl/g) | Melting point (° C.) | Content of hydroxyl group-containing monomer units (wt %) |
|--------|------------|----------------------|-----------------------------------------------------------|
| MPP[1] | 1.0        | 162                  | 3.6                                                       |
| MPP[2] | 0.8        | 152                  | 3.8                                                       |
| MPP[3] | 0.3        | 137                  | 12                                                        |

(C) Ethylene/α-olefin Copolymer Rubber
  EOR-1
  Polymer prepared by the use of metallocene catalyst
  1-Octene content: 45% by weight
  MFR (230° C., load of 2160 g): 2.5 g/10 min
  EOR-2
  Polymer prepared by the use of metallocene catalyst
  1-Octene content: 38% by weight
  MFR (230° C., load of 2160 g): 10 g/10 min (D) Styrene/Ethylene/Butene/Styrene Block Copolymer (SEBS)
  MFR (230° C., load of 2160 g): 4 g/10 min
  Styrene content: 20% by weight (E) Inorganic Filler
  Talc
  Average particle diameter: 4 μm (F) Conductive Carbon Black
  CB-1
  Carbon black having DBP oil absorption of 495 ml/100 g
  CB-2
  Carbon black obtained by surface treating CB-1 with titanate type coupling agent
  CB-3
  Carbon black having DBP oil absorption of 153 ml/100 g In each of the examples and the comparative examples, the component (A), the component (B), the component (C), the component (D), the component (E) and the component (F) were mixed in a mixing ratio shown in Table 2, and the mixture was melt kneaded by a Kobe Steel twin-screw extruder KTX-46 at a barrel temperature of 200° C. and a rotation speed of 450 rpm and then subjected to underwater cutting to obtain a polypropylene resin composition in the form of pellets.

The resulting composition was molded by a Niigata Seisakusho NN-220 type injection molding machine at a barrel temperature of 220° C. to prepare a specimen.

Examples 1 and 2, Comparative Examples 1 to 4

The results of properties and coating adhesion properties measured in the examples and the comparative examples are set forth in Table 2.

TABLE 2

| | Unit | Ex. 1 | Ex. 2 | Comp. Ex. 1 | Comp. Ex. 2 | Comp. Ex. 3 | Comp. Ex. 4 |
|---|---|---|---|---|---|---|---|
| MPP[1] | wt % | 40 | | 30 | | | |
| MPP[2] | wt % | | 35 | | | | 30 |
| MPP[3] | wt % | | | | 20 | 10 | |
| BCPP | wt % | 14 | 20 | 26 | 36 | 39 | 26 |
| HPP | wt % | | | | | 8 | |
| SEBS | wt % | 5 | 5 | 5 | 5 | 5 | 5 |
| EOR1 | wt % | 14 | 13 | 12 | 12 | 11 | 12 |
| EOR2 | wt % | 7 | 7 | 7 | 7 | 7 | 7 |
| Talc | wt % | 20 | 20 | 20 | 20 | 20 | 20 |
| Amount of hydroxyl group-containing monomer units in the composition | wt % | 1.4 | 1.3 | 1.1 | 2.4 | 1.2 | 1.1 |
| Initial adhesion | | AA | BB | CC | AA | CC | CC |
| MFR | g/10 min | 40 | 68 | 35 | 120 | 68 | 65 |
| Tensile elongation | % | 327 | 141 | >450 | 78 | 141 | 157 |
| Flexural modulus | MPa | 1684 | 1678 | 1743 | 1678 | 1841 | 1752 |
| IZOD23 | J/m | 367 | 121 | 377 | 102 | 235 | 125 |
| IZOD-30 | J/m | 33 | 31 | 34 | 16 | 18 | 31 |
| Load deflection temperature | °C. | 126 | 123 | 126 | 103 | 111 | 125 |
| Brittle temperature | °C. | −37 | −33 | −36 | −16 | −20 | −31 |

It can be seen from the results that Examples 1 and 2 exhibited excellent coating adhesion properties, had an excellent balance of mechanical properties and had excellent impact resistance and heat-resistant rigidity. In contrast, it can be seen that Comparative Examples 1 and 4 exhibited insufficient coating adhesion properties because the amount of the hydroxyl group-containing monomer units derived from the hydroxyl group-containing polypropylene (B) based on 100% by weight of the polypropylene resin composition did not satisfy the requirement of the present invention.

Further, it can be seen that Comparative Examples 2 and 3 were insufficient in the mechanical property balance and inferior to Examples 1 and 2 in the impact resistance and heat-resistant rigidity because the intrinsic viscosity [η] of the hydroxyl group-containing polypropylene (B) as measured in a decalin solvent at 135° C. and the melting point thereof as detected by a differential scanning calorimeter did not satisfy the requirements of the present invention.

Furthermore, it can be seen that Comparative Example 3 had insufficient coating adhesion properties because the amount of the hydroxyl group-containing monomer units derived from the hydroxyl group-containing polypropylene (B) based on 100% by weight of the polypropylene resin composition did not satisfy the requirement of the present invention, and Comparative Example 3 was inferior to Examples 1 and 2 in the impact resistance and heat-resistant rigidity because the intrinsic viscosity [η] of the hydroxyl group-containing polypropylene (B) as measured in a decalin solvent at 135° C. and the melting point thereof as detected by a differential scanning calorimeter did not satisfy the requirements of the present invention.

Examples 3 to 6, Comparative Example 5

The results of properties, conductivity and coating adhesion properties measured in the examples and the comparative examples are set forth in Table 3.

TABLE 3

| | Unit | Ex. 3 | Ex. 4 | Ex. 5 | Ex. 6 | Comp. Ex. 5 |
|---|---|---|---|---|---|---|
| MPP[1] | wt % | 40 | 40 | 40 | 40 | |
| MPP[3] | wt % | | | | | 20 |
| BCPP | wt % | 10 | 10.5 | 13 | 6 | 17 |
| HPP | wt % | | | | | 14 |
| SEBS | wt % | 5 | 5 | 5.3 | 5 | 5 |
| EOR1 | wt % | 14 | 11 | 11.7 | 11 | 13 |
| EOR2 | wt % | 7 | 7 | 7.5 | 7 | 7 |
| Talc | wt % | 20 | 20 | 20 | 20 | 20 |
| CB-1 | wt % | 4 | 1.5 | | | 4 |
| CB-2 | wt % | | | 2.5 | | |
| CB-3 | wt % | | 5 | | 11 | |
| Amount of hydroxyl group-containing monomer units in the composition | wt % | 1.4 | 1.4 | 1.4 | 1.4 | 2.4 |
| Initial adhesion | | AA | AA | BB | AA | AA |
| Volume resistivity | Ω·cm | $2.10 \times 10^3$ | $1.50 \times 10^5$ | $3.60 \times 10^5$ | $3.80 \times 10^5$ | $2.60 \times 10^4$ |
| MFR | g/10 min | 9 | 20 | 25 | 16 | 16 |
| Specific gravity | | 1.07 | 1.08 | 1.05 | 1.1 | 1.07 |

TABLE 3-continued

|  | Unit | Ex. 3 | Ex. 4 | Ex. 5 | Ex. 6 | Comp. Ex. 5 |
|---|---|---|---|---|---|---|
| Tensile elongation | % | 118 | 123 | 162 | 154 | 21 |
| Flexural modulus | MPa | 1444 | 1600 | 1520 | 1462 | 1553 |
| IZOD23 | J/m | 165 | 125 | 171 | 159 | 45 |
| IZOD-30 | J/m | 31 | 34 | 29 | 38 | 20 |
| Load deflection temperature | °C. | 111 | 111 | 115 | 107 | 97 |
| Brittle temperature | °C. | −18 | −19 | −18 | −24 | >10 |

It can be seen from the results that Examples 3 to 6 exhibited excellent coating adhesion properties and conductivity, and had excellent impact resistance and heat-resistant rigidity. In contrast, it can be seen that Comparative Example 5 was insufficient in the mechanical property balance and had poor impact resistance and heat-resistant rigidity because the intrinsic viscosity [η] of the hydroxyl group-containing polypropylene (B) as measured in a decalin solvent at 135° C. and the melting point thereof as detected by a differential scanning calorimeter did not satisfy the requirements of the present invention.

What is claimed is:

1. A polypropylene resin composition comprising:
   (A) (a-1) a crystalline propylene/ethylene block copolymer or (a-3) a polymer mixture comprising (a-1) the crystalline propylene/ethylene block copolymer and (a-2) a crystalline propylene homopolymer, in an amount of 5 to 56% by weight,
   (B) a hydroxyl group-containing polypropylene in an amount of 10 to 45% by weight,
   (C) a copolymer rubber of ethylene and an α-olefin, in an amount of 18 to 25% by weight,
   (D) a hydrogenation product of a block copolymer containing a polymer block of a monovinyl-substituted aromatic hydrocarbon compound and a polymer block of a conjugated diene compound, in an amount of 1 to 10% by weight, and
   (E) an inorganic filler in an amount of 15 to 25% by weight,
   the total amount of said components (A), (B), (C), (D) and (E) being 100% by weight,
   wherein:
   the crystalline propylene/ethylene block copolymer (a-1) comprises a propylene homopolymer portion and a propylene/ethylene random copolymer portion and has a melt flow rate (ASTM D-1238, 230° C., load of 2160 g) of 70 to 130 g/10 min, said propylene homopolymer portion having an isotactic pentad fraction (mmmm fraction), as measured by $^{13}$C-NMR, of not less than 97%, a content of said propylene/ethylene random copolymer portion being in the range of 5 to 20% by weight,
   the crystalline propylene homopolymer (a-2) has an isotactic pentad fraction (mmmm fraction) of not less than 97% by weight and a melt flow rate (ASTM D-1238, 230° C., load of 2160 g) of 100 to 300 g/10 min,
   the polymer mixture (a-3) comprises 50 to 99% by weight of the crystalline propylene/ethylene block copolymer (a-1) and 1 to 50% by weight of the crystalline propylene homopolymer (a-2), the total amount of said components (a-1) and (a-2) being 100% by weight,
   the hydroxyl group-containing polypropylene (B) has an intrinsic viscosity [η], as measured in decalin at 135° C., of 0.8 to 2.0 dl/g and a melting point, as detected by a differential scanning calorimeter, of 150 to 168° C.,
   the copolymer rubber (C) has a melt flow rate (ASTM D-1238, 230° C., load of 2160 g) of 0.5 to 15 g/10 min, and
   hydroxyl group-containing monomer units derived from the hydroxyl group-containing polypropylene (B) are contained in amounts of 1.3 to 4.0% by weight in 100% by weight of the polypropylene resin composition.

2. The polypropylene resin composition as claimed in claim 1, further comprising (F) a conductive carbon black in an amount of 1 to 15% by weight, in addition to to 55% by weight of the component (A), 10 to 45% by weight of the component (B), 18 to 25% by weight of the component (C), 1 to 10% by weight of the component (D) and 15 to 25% by weight of the component (E),
   the total amount of said components (A), (B), (C), (D), (E) and (F) being 100% by weight.

3. The polypropylene resin composition as claimed in claim 2, wherein the conductive carbon black (F) is contained in an amount of 1 to 10% by weight and has a DBP oil absorption of 300 to 500 ml/100 g.

4. The polypropylene resin composition as claimed in claim 1, wherein the hydroxyl group-containing polypropylene (B) is hydroxyl group-containing polypropylene obtained by melt kneading a mixture containing an ultrahigh molecular weight crystalline polypropylene resin having a melting point, as measured by a differential scanning calorimeter, of 150 to 168° C. and an intrinsic viscosity [η], as measured in decalin at 135° C., of 5 to 15 dl/g, a hydroxyl group-containing monomer in an amount of 0.3 to 10 parts by weight and an organic peroxide in an amount of 0.001 to 10 parts by weight, each of said amounts being based on 100 parts by weight of the ultrahigh molecular weight crystalline polypropylene resin.

5. The polypropylene resin composition as claimed in claim 1, wherein the hydroxyl group-containing polypropylene (B) is 2-hydroxyethyl methacrylate-modified polypropylene.

6. The polypropylene resin composition as claimed in claim 1, wherein the copolymer rubber (C) is a copolymer rubber of ethylene and an α-olefin of 6 or more carbon atoms.

7. The polypropylene resin composition as claimed in claim 1, wherein the hydrogenation product (D) of a block copolymer is a styrene/ethylene/butene/styrene block copolymer, a styrene/ethylene/propylene/styrene block copolymer or a styrene/ethylene/propylene block copolymer.

8. The polypropylene resin composition as claimed in claim 1, wherein the inorganic filler (E) is talc.

9. The polypropylene resin composition as claimed in any one of claims 1 to 8, which has a melt flow rate (ASTM D-1238, 230° C., load of 2160 g) of 10 to 70 g/10 min, a flexural modulus (ASTM D-790) of 1400 to 2800 MPa and a brittle temperature (ASTM D-746) of −10 to −40° C.

* * * * *